(12) United States Patent
Ninomiya et al.

(10) Patent No.: US 9,811,254 B2
(45) Date of Patent: Nov. 7, 2017

(54) TRANSACTION TERMINAL DEVICE, INFORMATION PROCESSING DEVICE AND INFORMATION PROCESSING METHOD

(71) Applicant: PANASONIC INTELLECTUAL PROPERTY MANAGEMENT CO., LTD., Osaka (JP)

(72) Inventors: Takeshi Ninomiya, Osaka (JP); Yoshihide Nakashima, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 212 days.

(21) Appl. No.: 14/689,534

(22) Filed: Apr. 17, 2015

(65) Prior Publication Data

US 2016/0034173 A1 Feb. 4, 2016

(30) Foreign Application Priority Data

Jul. 31, 2014 (JP) .................................. 2014-155793

(51) Int. Cl.
*G06F 3/0487* (2013.01)
*G06Q 20/34* (2012.01)
(Continued)

(52) U.S. Cl.
CPC .......... *G06F 3/0487* (2013.01); *G06F 3/0346* (2013.01); *G06Q 20/341* (2013.01);
(Continued)

(58) Field of Classification Search
CPC .............................. G06F 3/0488; G06Q 20/20
See application file for complete search history.

(56) References Cited

U.S. PATENT DOCUMENTS

2003/0004812 A1 1/2003 Kasasaku
2008/0011838 A1* 1/2008 Henry .................. G07G 1/0018
235/383
(Continued)

FOREIGN PATENT DOCUMENTS

JP 9-65436 3/1997
JP 2003-016536 1/2003
(Continued)

OTHER PUBLICATIONS

U.S. Appl. No. 14/706,124 to Kazuki Saitoh, filed May 7, 2015.
(Continued)

*Primary Examiner* — David Choi
(74) *Attorney, Agent, or Firm* — Greenblum & Bernstein, P.L.C.

(57) ABSTRACT

A transaction terminal device includes an orientation detecting unit that detects the orientation of an information processing device with respect to the orientation of gravity, and an information processing unit that displays a work screen of work categories on a display unit based on display attributes for changing of the orientation of the information processing device configured for each of the work categories. When the display attributes are permitted for rotating the work screen based on the changing of the orientation of the information processing device, the information processing unit displays the respective elements constituting the work screen in the position/orientation based on the detected result by the orientation detecting unit. When the display attributes are prohibited from rotating the work screen, the information processing unit displays the respective elements constituting the work screen in the fixed position/orientation independent from the detected result by the orientation detecting unit.

12 Claims, 12 Drawing Sheets

(51) Int. Cl.
*G06Q 20/40* (2012.01)
*G07F 7/08* (2006.01)
*G07F 7/10* (2006.01)
*G06F 3/0346* (2013.01)

(52) U.S. Cl.
CPC ......... *G06Q 20/347* (2013.01); *G06Q 20/352* (2013.01); *G06Q 20/4012* (2013.01); *G07F 7/0893* (2013.01); *G07F 7/1033* (2013.01)

(56) References Cited

U.S. PATENT DOCUMENTS

2009/0178008 A1* 7/2009 Herz ................... G06F 3/04817 715/840
2016/0034173 A1* 2/2016 Ninomiya ............ G06Q 20/341 715/773

FOREIGN PATENT DOCUMENTS

| JP | 2004-355211 | 12/2004 |
|---|---|---|
| JP | 2010-218440 | 9/2010 |
| JP | 2014-006637 | 1/2014 |

OTHER PUBLICATIONS

U.S. Appl. No. 14/638,024 to Takeshi Ninomiya, filed Mar. 4, 2015.
U.S. Appl. No. 14/706,135 to Manabu Matsumoto et al., filed May 7, 2015.
U.S. Appl. No. 14/666,788 to Kenya Yasutomi et al., filed Mar. 24, 2015.
U.S. Appl. No. 14/638,140 to Takeshi Ninomiya et al., filed Mar. 4, 2015.
U.S. Appl. No. 14/636,418 to Manabu Matsumoto, filed Mar. 3, 2015.
U.S. Appl. No. 14/636,400 to Manabu Matsumoto, filed Mar. 3, 2015.
U.S. Appl. No. 14/640,560 to Takeshi Ninomiya et al., filed Mar. 6, 2015.
"Specify the direction of screen for each app in portrait or landscape and prevent automatic rotation of screen! "Smart Rotator"" Apr. 23, 2012 16:04 by andronavi (http://andronavi.com/2012/04/179893).

* cited by examiner

FIG. 3

*OPTION WORK CATEGORY

| HIGHER LAYER WORK CATEGORY | | | | LOWER LAYER WORK CATEGORY |
|---|---|---|---|---|
| DURING POWER STARTUP | | | | |
| ROOT MENU | | | | |
| | CARD SETTLEMENT | | | |
| | | CREDIT CARD SETTLEMENT | | |
| | | | CARD READING | |
| | | | SCAN PROMPT | |
| | | | MAGNETIC CARD SETTLEMENT | |
| | | | | BRAND SELECTION |
| | | | | AMOUNT OF MONEY INPUT |
| | | | | PAYMENT METHOD/NUMBER OF PAYMENTS INPUT |
| | | | | PAD SIGNATURE INPUT |
| | | | | SETTLEMENT REQUEST TRANSMISSION |
| | | | | SETTLEMENT RESULT DISPLAY |
| | | | | RECEIPT PRINT |
| | | | IC CARD SETTLEMENT | |
| | | | | BRAND SELECTION |
| | | | | AMOUNT OF MONEY INPUT |
| | | | | PAYMENT METHOD/NUMBER OF PAYMENTS INPUT |
| | | | | PIN INPUT |
| | | | | SETTLEMENT REQUEST TRANSMISSION |
| | | | | SETTLEMENT RESULT DISPLAY |
| | | | | RECEIPT PRINT |
| | | | ... | |
| | | DEBIT CARD SETTLEMENT | | |
| | | ELECTRONIC MONEY PRE-PAID SETTLEMENT | | |
| | | ELECTRONIC MONEY POST-PAID SETTLEMENT | | |
| | | ... | | |
| | TASK | | | |
| | | SALES MANAGEMENT | | |
| | | SELLING RESULT REPORT | | |
| | | ... | | |
| | GENERAL PURPOSE | | | |
| | | ELECTRONIC MAIL | | |
| | | NETWORK BROWSER | | |
| | | ... | | |
| MAINTENANCE | | | | |
| | SOFTWARE VERSION MANAGEMENT | | | |
| | USER MANAGEMENT | | | |
| SHUTDOWN | | | | |

FIG. 4

| WORK CATEGORY (* OPTION WORK CATEGORY) | DISPLAY IN NON-SECURE DISPLAY REGION | DISPLAY IN SECURE DISPLAY REGION | ROTATION | NOTE |
|---|---|---|---|---|
| DURING POWER START-UP | PERMISSION | — | PERMISSION | |
| ROOT MENU | PERMISSION | — | PERMISSION | |
| CARD SETTLEMENT | | | | |
| CREDIT CARD SETTLEMENT | PERMISSION | — | PERMISSION | |
| CARD READING | PERMISSION | — | PERMISSION | |
| SCAN PROMPT | PERMISSION | — | PERMISSION | |
| MAGNETIC CARD SETTLEMENT | PERMISSION | — | PERMISSION | |
| IC CARD SETTLEMENT | PERMISSION | — | PERMISSION | |
| BRAND SELECTION | PERMISSION | — | PERMISSION | |
| AMOUNT OF MONEY INPUT | PERMISSION | — | PERMISSION | |
| PAYMENT METHOD NUMBER OF PAYMENTS INPUT | PERMISSION | — | PERMISSION | |
| PAD SIGNATURE INPUT | PROHIBITION | SIGNATURE PAD | PROHIBITION | * FIX IN LANDSCAPE DIRECTION |
| PIN INPUT | PROHIBITION | VIRTUAL NUMERAL KEY | PERMISSION | |
| SETTLEMENT REQUEST TRANSMISSION | PERMISSION | — | PERMISSION | |
| SETTLEMENT RESULT DISPLAY | PERMISSION | — | PERMISSION | |
| RECEIPT PRINT | PERMISSION | — | PERMISSION | |
| ... | ... | ... | ... | |
| DEBIT CARD SETTLEMENT | PERMISSION | — | PERMISSION | |
| ELECTRONIC MONEY PRE-PAID SETTLEMENT | PERMISSION | — | PERMISSION | |
| ELECTRONIC MONEY POST-PAID SETTLEMENT | PERMISSION | — | PERMISSION | |
| ... | ... | ... | ... | |
| TASK | | | | |
| SALES MANAGEMENT | PERMISSION | — | PERMISSION | |
| SELLING RESULT REPORT | PERMISSION | — | PERMISSION | |
| ... | ... | ... | ... | |
| GENERAL PURPOSE | | | | |
| ELECTRONIC MAIL | PERMISSION | — | PERMISSION | |
| NETWORK BROWSER | PERMISSION | — | PERMISSION | |
| ... | ... | ... | ... | |
| MAINTENANCE | | | | |
| SOFTWARE VERSION MANAGEMENT | PERMISSION | DISPLAY | PROHIBITION | |
| USER MANAGEMENT | PROHIBITION | DISPLAY | PROHIBITION | |
| SHUTDOWN | PERMISSION | — | PERMISSION | |

TRANSACTION TERMINAL DEVICE, INFORMATION PROCESSING DEVICE AND INFORMATION PROCESSING METHOD

BACKGROUND OF THE INVENTION

1. Field of the Invention

The present invention relates to a transaction terminal device, an information processing device and an information processing method that are used for performing, for example, settlement or commercial transaction.

2. Description of the Related Art

In a credit transaction using a credit card, security of the transaction is secured by confirming (identity verification) whether or not a person who conducts the transaction and a possessor of the credit card used for the transaction are the same person. For example, the identity verification is performed by writing a signature by a customer on a transaction slip which is output at the time of a transaction process and on which the transaction content is printed, and comparing this signature with a signature that appears on the credit card by a clerk through a visual check.

When the transaction process is performed using a settlement terminal, if the settlement terminal is located at a place separated from the clerk and the customer, a time taken for the clerk to hold the card of the customer may be long. In this case, customer service may become worse, or the customer may feel anxiety. A time taken for the clerk to complete the settlement in the transaction process may become longer, and a time for which the clerk assigns to sales activities may be restricted.

A transaction terminal device described in Japanese Patent Unexamined Publication No. 2003-016536 includes an input unit for inputting a signature, and a display unit that displays the signature input from the input unit, and is a portable device that performs a settlement process requiring a signature of a customer.

However, for example, in the transaction terminal device, the orientation of the transaction terminal device when the clerk or the customer holds the transaction terminal device is not considered. For this reason, depending on the orientation of the transaction terminal device, it may be difficult to perform the input operation or display confirming operation by the clerk or the customer in the settlement process. Specifically, the orientation in which the transaction terminal is held is actually fixed based on the orientation of characters displayed on a screen, and, for example, even when the signature is input in a horizontal writing manner, the customer inputs the signature in a transversal direction of the screen, and thus, the signature is forcibly input into an input region having a small area. When the signature is confirmed by the clerk, the signature input into the input region having a small area needs to be compared with a signature on a rear surface of the card through a visual check.

SUMMARY OF THE INVENTION

A transaction terminal device, an information processing device and an information processing method of the present disclosure can easily perform a settlement process, and input operation and display confirmation in other task processes in an optimum manner.

A settlement terminal device of the present disclosure includes a display unit, a orientation detecting unit that detects the orientation of the transaction terminal device with respect to the orientation of gravity, an input unit that is used to input information which is displayed on the display unit and constitutes a transaction, and an information processing unit that determines the display orientation of the input unit with respect to the orientation of the transaction terminal device based on work categories.

An information processing device of the present disclosure includes a display unit, a orientation detecting unit that detects the orientation of the information processing device with respect to the orientation of gravity, and an information processing unit that displays a work screen of work categories on the display unit based on display attributes for changing of the orientation of the information processing device configured for each of the work categories.

An information processing method of the present disclosure is an information processing method of an information processing device including a display unit. The information processing method includes detecting the orientation of the information processing device with respect to the orientation of gravity, and displaying a work screen of work categories on the display unit based on display attributes for changing of the orientation of the information processing device configured for each of the work categories.

An information processing method of the present disclosure is an information processing method of a transaction terminal device including a display unit. The information processing method includes detecting the orientation of the transaction terminal device with respect to the orientation of gravity, and determining the display orientation of an input unit for inputting information, which is displayed on the display unit and constitutes a transaction, with respect to the detected orientation of the transaction terminal device based on work categories.

According to the present disclosure, it is possible to enhance the input and display of the information processing device in the form suitable for the respective work screens. Accordingly, it is possible to easily perform input operation and display confirmation in a settlement process, and it is possible to improve convenience of a user.

BRIEF DESCRIPTION OF DRAWINGS

FIG. 3 is a diagram showing an example of a work category list;

FIG. 4 is a diagram showing an example of a display attribute table of work screens of the respective work categories;

DETAILED DESCRIPTION OF THE PREFERRED EMBODIMENT

Hereinafter, exemplary embodiments of the present invention will be described with reference to the drawings.

Background of Embodiment of Present Invention

A terminal device capable of inputting and displaying a signature is implemented by, for example, a mobile terminal (for example, a smart phone or a tablet terminal). Many mobile terminals are distributed for consumers, and can set up a settlement system at low costs.

Meanwhile, the display orientation of the mobile terminal is changed depending on the orientation of the mobile terminal with respect to, for example, gravity. A transaction terminal device that executes a settlement process performs the settlement process by receiving a personal identification number (PIN) input or another input other than the signature of a customer in some cases depending on the type of a card. Accordingly, it is desirable that convenience of the input and display in the transaction terminal device is secured even using any method.

Hereinafter, an information processing device, an information processing method, an information processing program, and a recording medium that can easily perform input operation and display confirmation in the settlement process will be described.

First Exemplary Embodiment

Figure 1A:
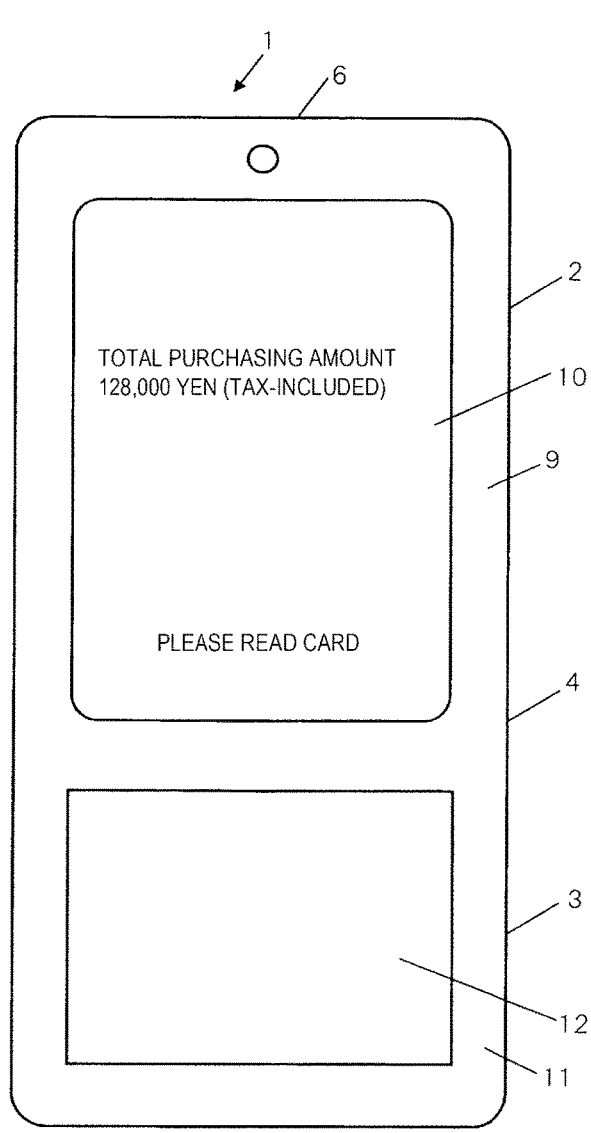
FIG. 1A is a front external view showing an example of a settlement terminal device according to a first exemplary embodiment.
Figure 1B:
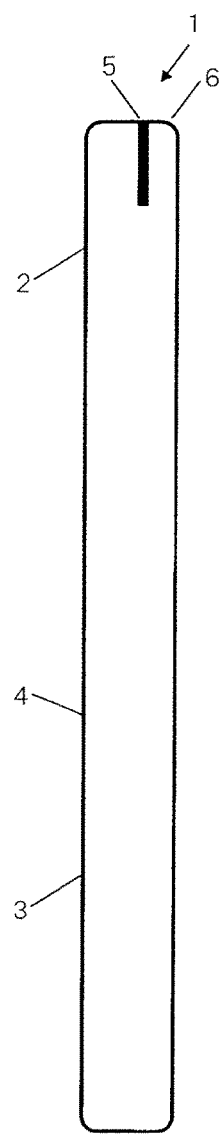
FIG. 1B is a side external view showing an example of the settlement terminal device according to the first exemplary embodiment.

FIG. 1A is a front external view showing a configuration example of settlement terminal device 1 according to a first exemplary embodiment. FIG. 1B is a side external view showing an example of settlement terminal device 1.

Settlement terminal device 1 is a portable type, and includes first information processing unit 2, and "secure" second information processing unit 3. The "secure" means that the unit has tamper resistance. The "tamper resistance" refers to resistance to attack that tries to steal information from the terminal. For example, by having the tamper resistance, information related to a customer is protected in the settlement process, and it is possible to safely perform a transaction. First information processing unit 2 may have a "secure" configuration or may have a "non-secure" configuration. The "non-secure" means that the unit does not have the tamper resistance.

Settlement terminal device 1 includes slit 5 in upper surface 6 of first information processing unit 2. Slit 5 is a path through which a magnetic card is slid and for reading a magnetic stripe of the magnetic card. Slit 5 may not be formed in first information processing unit 2, and may be formed in second information processing unit 3.

Settlement terminal device 1 includes two input units and display units, that is, two touch panels. Specifically, first touch panel 10 and second touch panel 12 are provided on front surface 9 (negative-side surface in a Z axis).

Figure 2:
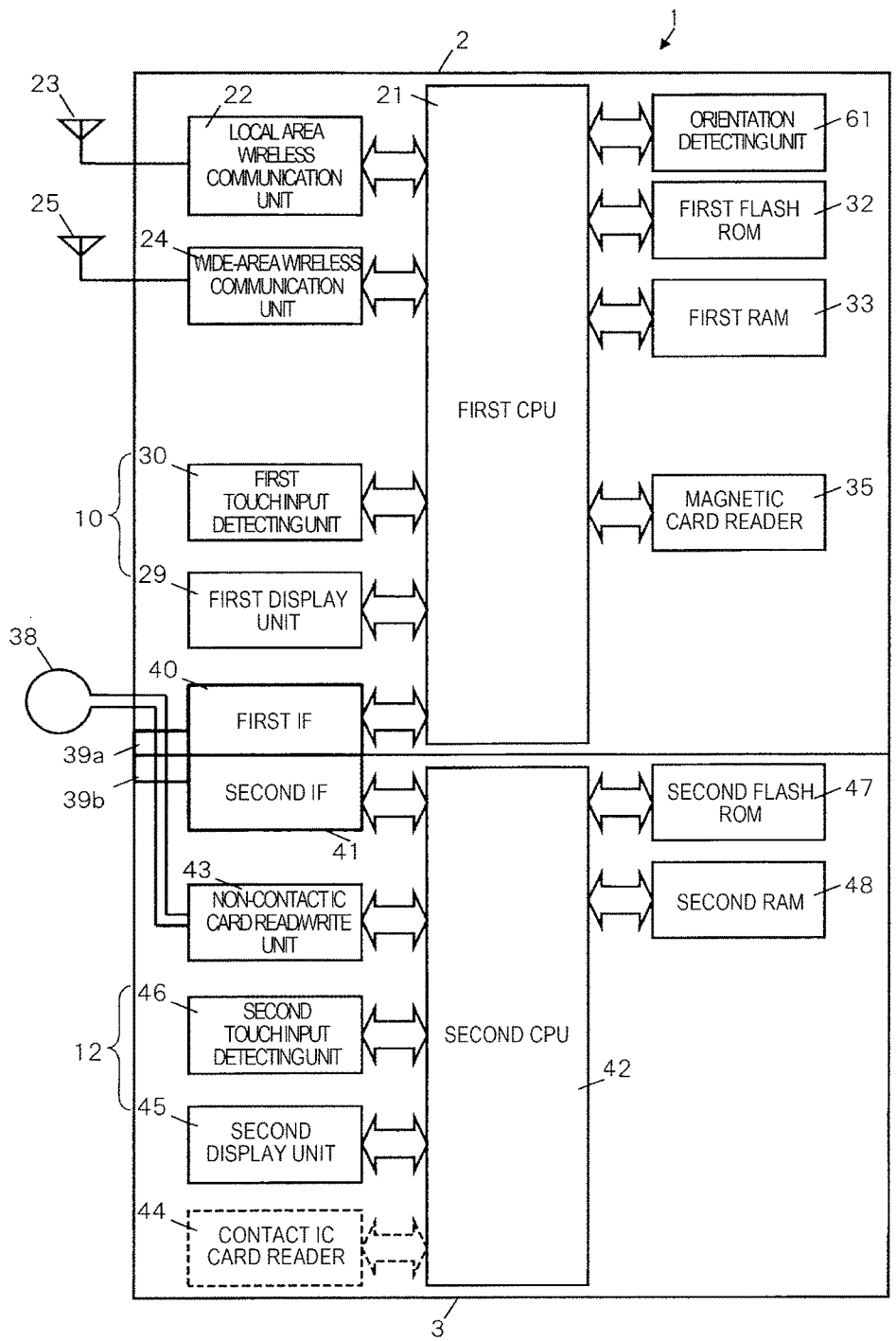
FIG. 2 is a block diagram showing a configuration example of the settlement terminal device according to the first exemplary embodiment.

FIG. 2 is a block diagram showing a configuration example of settlement terminal device 1.

Settlement terminal device 1 includes first information processing unit 2, and second information processing unit 3. First information processing unit 2 includes first central processing unit (CPU) 21, local area wireless communication unit 22, wide-area wireless communication unit 24, voice input/output unit 26, first display unit 29, and first touch input detecting unit 30. First information processing unit 2 includes first flash read-only memory (ROM) 32, first random-access memory (RAM) 33, key input unit 34, magnetic card reader 35, first power supply 36, and first interface (IF). First information processing unit 2 may include orientation detecting unit 61.

In first information processing unit 2, various components are connected to first CPU 21. First CPU 21 generalizes the entire first information processing unit 2, and performs, for example, controlling, processing, setting, determining, deciding and confirming in various manners.

Local area wireless communication unit 22 is connected to local area wireless communication antenna 23, and has a function of performing, for example, wireless LAN communication using a non-illustrated local area wireless communication path. Local area wireless communication unit 22 may perform communication (for example, Bluetooth (registered trademark)) other than wireless LAN communication.

Wide-area wireless communication unit 24 is connected to wide-area wireless communication antenna 25, and has a function of performing communication through a non-illustrated wide-area wireless communication path (for example, wide area network (WAN)). Communication in the wide-area wireless communication path may be performed using, for example, mobile communication such as wideband code division multiple access (W-CDMA), universal mobile telecommunications system (UMTS), code division multiple access (CDMA) 2000, or long term evolution (LTE).

First display unit 29 has a function of controlling a display of first touch panel 10 (see FIG. 1). First display unit 29 may be a device other than an LCD, for example, an organic EL. First touch input detecting unit 30 has a function of detecting a touch input on first touch panel 10.

First flash ROM 32 has a function of storing various data. The stored data may be data about a task, or may be programs for controlling settlement terminal device 1 (for example, first information processing unit 2).

For example, when arithmetic processing according to the operation of settlement terminal device 1 (for example, first information processing unit 2) is performed, first RAM 33 is a memory used for temporarily storing process data generated during the arithmetic process.

Magnetic card reader 35 is arranged within slit 5 shown in FIG. 1, and has a function of reading the magnetic stripe of the magnetic card.

Non-contact IC card read/write unit 43 has a function of reading a non-contact IC card. Non-contact IC card read/write unit 43 is connected to a loop antenna (not shown) arranged in first information processing unit 2 through first interface (hereinafter, referred to as a "first IF") 40 and second interface (hereinafter, referred to as a "second IF") 41. Settlement terminal device 1 may include contact IC card reader 44. Contact IC card reader 44 has a function of reading card information through an electrode of the contact IC card inserted into an insertion hole (not shown) formed in a housing.

First information processing unit 2 and second information processing unit 3 are connected to each other through first interface (hereinafter, referred to as a "first IF") 40 and second interface (hereinafter, referred to as a "second IF") 41, and various data and commands are delivered therebetween. First IF 40 and second IF 41 can be coupled to each other.

Second information processing unit 3 includes second IF 41, second CPU 42, second display unit 45, second touch input detecting unit 46, second flash ROM 47, second RAM 48, secure input unit 49, and second power supply 50. In the present exemplary embodiment, the orientation detecting unit is provided in first information processing unit 2, but may be provided in second information processing unit 3 instead.

In second information processing unit 3, various components are connected to second CPU 42. Second CPU 42 generalizes the entire second information processing unit 3, and performs, for example, controlling, processing (for example, settlement process), setting, determining, deciding, confirming, authenticating and inquiring (for example, inquiry about PIN or signature) in various manners.

Second display unit 45 has a function of controlling a display of second touch panel 12 (see FIG. 1). Second display unit 45 may be a device other than an LCD, for example, an organic EL. Second touch input detecting unit 46 has a function of detecting a touch input on second touch panel 12.

Second flash ROM 47 has a function of storing various data. The stored data may be data about a task, or may be programs for controlling settlement terminal device 1 (for example, second information processing unit 3).

When arithmetic processing according to the operation of settlement terminal device 1 (for example, second information processing unit 3) is performed, second RAM 48 is a memory used for temporarily storing process data generated during the arithmetic processing.

Settlement terminal device 1 includes orientation detecting unit 61 that detects the orientation of settlement terminal device 1 with respect to gravity. For example, orientation detecting unit 61 is provided in at least one of first information processing unit 2 and second information processing unit 3. Orientation detecting unit 61 includes, for example, an acceleration sensor. In FIG. 2, it is described that orientation detecting unit 61 is provided in first information processing unit 2. In addition, settlement terminal device 1 includes a power supply (not shown) for supplying power to the respective components of first information processing unit 2 and second information processing unit 3.

In settlement terminal device 1 according to Exemplary Embodiment 1, the inputting and displaying of authentication information (for example, signature or PIN information) of a card used for the settlement is performed on second touch panel 12 included in "secure" second information processing unit 3. Accordingly, settlement terminal device 1 can input and display the authentication information of the card used for the settlement, and can secure the "tamper resistance". A "secure" region requiring the "tamper resistance" is localized in second information processing unit 3.

Meanwhile, as first information processing unit 2, for example, hardware and software of many information terminals (for example, smart phones or tablet terminals) distributed for consumers may be used. As first information processing unit 2, a general purpose operating system (OS) is used as a software platform, for example.

Accordingly, development resources of application software (hereinafter, referred to as a "settlement application") for the settlement and application software (hereinafter, referred to as a "task application") used for other tasks are easily reused or applied. For example, the settlement application and the another task application are flexibly operated without stress by being processed by first information processing unit 2 having, for example, high arithmetic processing ability.

It is possible to suppress an increase in development costs or prices of settlement terminal device 1 in which settlement schemes are diversified.

FIG. 3 is a diagram showing an example of a work category list. The work categories may be arbitrarily classified as long as the work categories can be expressed as a group of works. In the work category list shown in FIG. 3, higher layer work categories are arranged on a left side of a work screen, and lower layer work categories are arranged toward a right side.

For example, the respective work categories related to "during power start-up", "root menu", "maintenance", and "shut down" are prepared in the highest layer of the work category list shown in FIG. 3.

For example, the respective work categories related to "card settlement", "task", and "general purpose" are prepared in the lower layer of the work category "root menu". For example, the respective work categories related to "credit card settlement", "debit card settlement", "pre-paid electronic money settlement", and "post-paid electronic money settlement" are prepared in the lower layer of the work category "card settlement". For example, among these work categories, the work category related to "card reading" is prepared in the lower layer of the work category "credit card settlement". The respective work categories related to "scan prompt" (screen for prompting the user to read card), "magnetic card settlement", and "IC card settlement" are prepared in the lower layer.

For example, the respective work categories related to "brand selection", "amount of money input", "payment method/number of payments input", "PAD signature input", "settlement request transmission", "settlement result display", and "receipt print" are prepared in the lower layer of the work category "magnetic card settlement". The "PAD signature input" may be omitted. For example, the respective work categories related to "brand selection", "amount of money input", "payment method/number of payments input", "PIN input", "settlement request transmission", "settlement result display", and "receipt print" are prepared in the lower layer of the work category "IC card settlement".

FIG. 4 is a diagram showing an example of a display attribute table of work screens of the respective work categories. The display attribute table of the work screens of the respective work categories is stored in, for example, second flash ROM (see FIG. 2). The work screen of the work categories that appears multiples times in FIG. 3 is shown as one screen in FIG. 4. In FIG. 4, the respective work screens of "during power start-up", "root menu", "card settlement" and "credit settlement", the entire work screen of "task" and the entire work screen of "general purpose" are permitted for displaying on first display unit 29 (that is, "application display region"). Positions and/or orientations of the respective display elements constituting the respective work screens are permitted for changing depending on the orientation of gravity detected by orientation detecting unit 61 (see FIG. 2).

In contrast, for example, the respective work screens of "PAD signature input" and "PIN input" are prohibited from displaying on first display unit 29, and are displayed on second display unit 45. On a display screen of second display unit 45, positions and/or orientations of the respective display elements constituting the work screen of "PIN input" are permitted for changing based on the orientation of gravity detected by orientation detecting unit 61. Positions and/or orientations of the respective display elements constituting the work screen of "PAD signature input" are not permitted for changing based on the orientation of gravity detected by orientation detecting unit 61, and the respective display elements constituting the work screen of "PAD signature input" are displayed on predetermined positions and/or orientations (for example, landscape direction).

As stated above, the display attributes of the work screens of the respective work categories, that is, the positions and/or the orientations of the respective display elements constituting the work screen are configured for each of the work categories. Thus, even though software that processes the respective work categories is changed, the display attributes of the corresponding work screen are independently defined as including the work category. Accordingly, the positions and/or the orientations of the respective display elements constituting the display of the work screen are configured for each of the work categories simply and reliably such that the positions and/or the orientations thereof is easily controlled by an operator.

More specifically, settlement terminal device 1 includes orientation detecting unit 61 that detects the orientation of settlement terminal device 1 with respect to the orientation of gravity, and an input unit used to input information which is displayed on second display unit 45 and constitutes a transaction. More specifically, the input unit is, for example, PIN input screen 101 (see FIG. 7) or a PAD signature input screen 102 (see FIG. 9). The display orientation of the input unit with respect to the orientation of settlement terminal device 1 detected by orientation detecting unit 61 is determined according to the work categories shown in FIGS. 3 and 4. In such a configuration, even though software that processes the respective work categories is changed, the input unit for inputting the information constituting the transaction displayed on second display unit 45 is independently defined as including the corresponding work category. Accordingly, the orientation of the input unit for inputting the information constituting the transaction is configured simply and reliably so that the orientation thereof is easily controlled by the operator. The operator of settlement terminal device 1 can easily confirm the input unit for inputting the information constituting the transaction without stress in an optimum manner of the respective work categories, and thus, convenience of the operator is improved. Accordingly, it is possible to easily perform input operation and display confirmation of the transaction process to start the settlement, and it is possible to improve convenience of the user.

Figure 5:
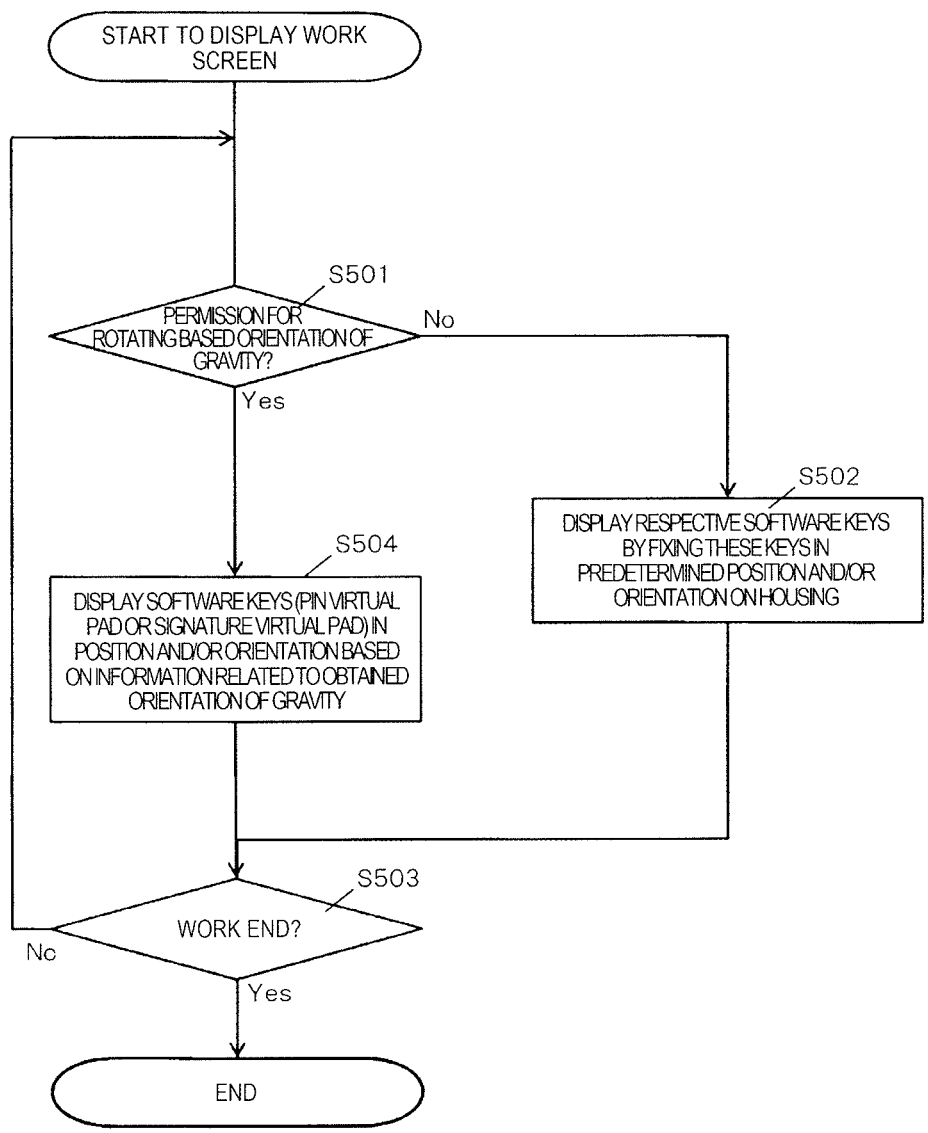
FIG. 5 is a flowchart showing an example of a display flow of the work screens of the respective work categories.

FIG. 5 is a flowchart showing a display flow of the work screens of the respective work categories. The display flow of the work screen shown in FIG. 5 is executed as one unit of the respective work categories.

When the display attributes of the work screen being executed is "non-permission for rotation along with the orientation of gravity" ("NO" in step S501), settlement terminal device 1 (see FIG. 2) displays the respective software keys (display elements) of the work screen by fixing the respective software keys thereof at predetermined positions and/or orientations on the housing (step S502). That is, the positions and/or orientations of the respective display elements constituting the work screen are fixed to the predetermined positions and/or orientations on the housing regardless of the orientation of gravity detected by orientation directing unit 61 (see FIG. 2).

Thereafter, settlement terminal device 1 confirms whether or not the process of the work category to which the work screen is related is ended (step S503). When the process of the work category is not ended, settlement terminal device 1 returns to step S501, and continues the process related to the displaying of the work screen ("NO" in step S503). When the process of the work category is ended, settlement terminal device 1 ends the displaying of the work screen ("Yes" in step S503).

When the display attributes of the work screen being executed is "permission for rotating along with the orientation of gravity" ("Yes" in step S501), settlement terminal device 1 (see FIG. 2) displays the respective software keys (display elements) of the work screen in positions and/or orientations according to the obtained orientation of gravity (step S504). The positions and/or orientations of the respective display elements may be calculated by a calculation formula with the orientation of gravity as a reference. Alternatively, settlement terminal device 1 may divide the orientation range of gravity into several ranges, store the divided orientation ranges of gravity as a table in advance, and refer to the table.

Subsequently, settlement terminal device 1 confirms whether or not the process of the work category to which the work screen is related is ended (step S503). When the process of the work category is not ended, settlement terminal device 1 returns to step S501, and continues the process related to the displaying of the work screen ("No" in step S503). When the process of the work category is ended, settlement terminal device 1 ends the displaying of the work screen ("Yes" in step S503).

As an example in which the content described with reference to FIGS. 3 to 5 is specifically implemented, a processing flow of the credit card settlement using settlement terminal device 1 according to Exemplary Embodiment 1 and a display example of first touch panel 10 and second touch panel 12 will be described with reference to FIGS. 6 to 9.

Figure 6:
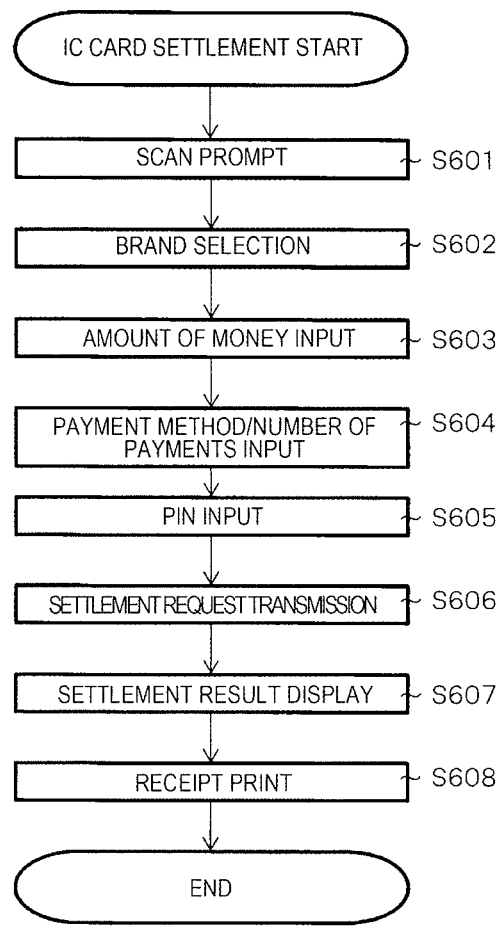
FIG. 6 is a flowchart showing an example of an IC card settlement process by the settlement terminal device.
Figure 7A:
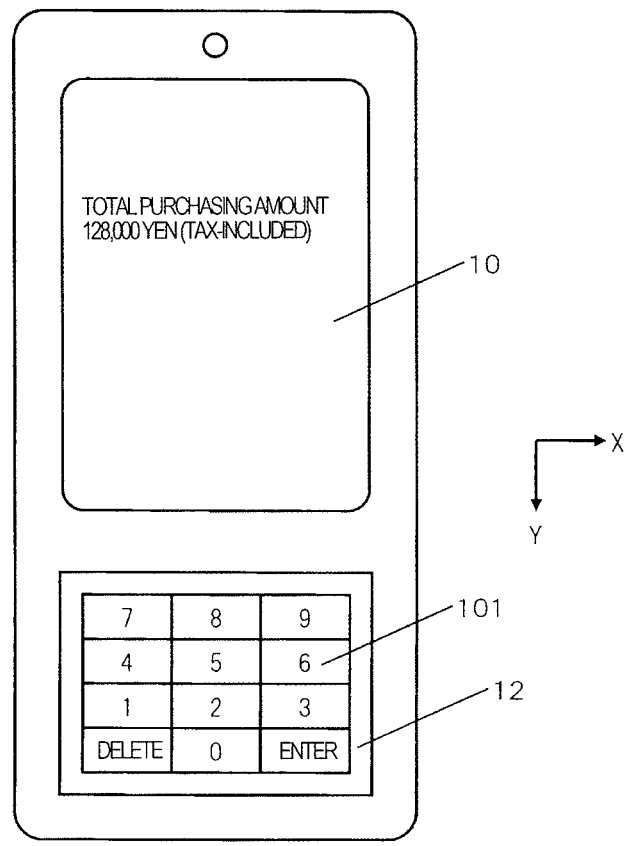
FIG. 7A is a schematic diagram showing a display example of amount of money information and a PIN input screen of the settlement terminal device.
Figure 7B:
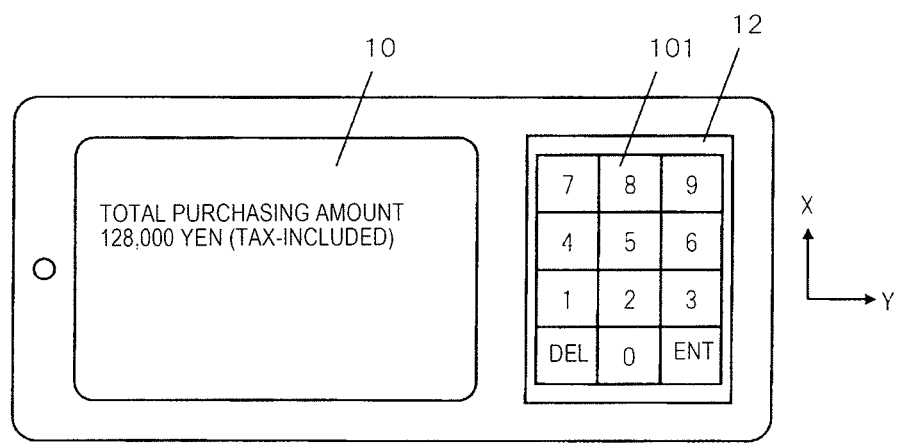
FIG. 7B is a schematic diagram showing a display example of a personal identification number (PIN) input screen and amount of money information in the settlement terminal device according to the first exemplary embodiment.

First, the relationship between an IC card settlement process and a display screen will be described. FIG. 6 is a flowchart showing an example of the IC card settlement process by settlement terminal device 1. FIGS. 7A and 7B are schematic diagrams showing display examples of amount of money information 100 and PIN input screen 101 of settlement terminal device 1.

In FIG. 6, when the IC card settlement process is started, settlement terminal device 1 (see FIG. 2) displays scan prompt for prompting the operator to read information related to a card used for the settlement according to the flow shown in FIG. 5 described above (S601). As shown in FIG. 4, the scan prompt is permitted for displaying on first display unit 29 (see FIGS. 1 and 2) which is the non-secure display region, and is permitted for rotating of the display orientation thereof. Accordingly, with regard to the displaying of the scan prompt on first display unit 29, settlement terminal device 1 performs the process corresponding to "Yes" in step S501 shown in FIG. 5. Thus, the display screen of the scan prompt in step S601 of FIG. 6 is displayed in the position and/or the orientation based on the detected result by orientation detecting unit 61 (see FIG. 2) of settlement terminal device 1.

When the card is read by non-contact IC card read/write unit 43 or contact IC card reader 44 (see FIG. 2), settlement terminal device 1 displays a selection screen of card brand information used for the settlement (S602). As shown in FIG. 4, the selection screen of the card brand information is permitted for displaying on first display unit 29 which is the non-secure display region, and is permitted for rotating of the display orientation thereof. Accordingly, with regard to the displaying of the selection screen of the card brand information on first display unit 29, settlement terminal device 1 performs the process corresponding to "Yes" in step S501 of the display flow shown in FIG. 5. Thus, the selection screen of the card brand information in step S602 of FIG. 6 is displayed in the position and/or the orientation based on the detected result by orientation detecting unit 61 of settlement terminal device 1.

When the card brand information used for the settlement is selected, settlement terminal device 1 displays an amount of money input screen to be settled (S603). As shown in FIG. 4, the amount of money input screen is permitted for displaying on first display unit 29 which is the non-secure display region, and is permitted for rotating of the display orientation thereof. Accordingly, with regard to the displaying of the amount of money input screen on first display unit 29, settlement terminal device 1 performs the process corresponding to "Yes" in step S501 of the display flow shown in FIG. 5. Thus, the amount of money input screen in step S603 of FIG. 6 is displayed in the position and/or the orientation based on the detected result by orientation detecting unit 61 of settlement terminal device 1.

When the settlement amount of money is input, settlement terminal device 1 displays a payment method selection/number of payments input screen (S604). As shown in FIG. 4, the payment method selection/number of payments input screen is permitted for displaying on first display unit 29 which is the non-secure display region, and is permitted for rotating of the display orientation thereof. Accordingly, with regard to the displaying of the payment method selection/number of payments input screen on first display unit 29, settlement terminal device 1 performs the process corresponding to "Yes" in step S501 of the display flow shown in FIG. 5. Thus, the payment method selection/number of payments input screen in step S604 of FIG. 6 is displayed in the position and/or the orientation based on the detected result by orientation detecting unit 61 of settlement terminal device 1.

When the selection of the payment method and the number of payments input are performed, settlement terminal device 1 displays a PIN input screen (S605). As shown in FIG. 4, the PIN input screen is prohibited from displaying on first display unit 29 which is the non-secure display region, and is permitted for displaying on second display unit 45 (FIGS. 1 and 2) which is the secure display region. The PIN input screen is permitted for rotating of the display orientation thereof. Accordingly, with regard to the displaying of the PIN input screen on second display unit 45, settlement terminal device 1 performs the process corresponding to "Yes" in step S501 of the display flow shown in FIG. 5. Thus, the PIN input screen in step S605 of FIG. 6 is displayed in the position and/or the orientation based on the detected result by orientation detecting unit 61 of settlement terminal device 1. The displaying example of the PIN input screen on the second display unit of settlement terminal device 1 will be described below.

When the PIN is input, settlement terminal device 1 transmits a settlement request to a settlement center (not shown) (S606), and displays a screen indicating that the settlement process is being performed before a settlement result is received from the settlement center. As shown in FIG. 4, the screen displayed before the settlement result from the settlement center is received after the settlement request is transmitted by settlement terminal device 1 is permitted for displaying on first display unit 29 (see FIGS. 1 and 2) which is the non-secure display region, and is permitted for rotating of the display orientation thereof. Accordingly, with regard to the displaying of the screen displayed before the settlement result from the settlement center is received after the settlement request is transmitted by settlement terminal device 1 on first display unit 29, settlement terminal device 1 performs the process corresponding to "Yes" in step S501 of the display flow shown in FIG. 5. Thus, in step S606 of FIG. 6, the screen displayed before the settlement result from the settlement center is received after the settlement request is transmitted by settlement terminal device 1 is displayed on the position and/or the orientation based on the detected result by orientation detecting unit 61 (see FIG. 2) of settlement terminal device 1.

Settlement terminal device 1 displays the settlement result received from the settlement center (S607), and after the settlement result is printed as a receipt (S608), the IC card settlement process is ended. As shown in FIG. 4, the display screen of the settlement result in step S607 is permitted for displaying on first display unit 29 (see FIGS. 1 and 2) which is the non-secure region, and is permitted for rotating of the display orientation thereof. Accordingly, with regard to the displaying of the settlement result on first display unit 29, settlement terminal device 1 performs the process corresponding to "Yes" in step S501 of the display flow shown in FIG. 5. Thus, the display screen of the settlement result in step S607 of FIG. 6 is displayed in the position and/or the orientation based on the detected result by orientation detecting unit 61 (see FIG. 2) of settlement terminal device 1. The subsequent display screen is the same as the display screen in step S608.

The PIN input screens 101 of FIGS. 7A and 7B displayed in step S605 of FIG. 6 described above will be described in detail. In FIGS. 7A and 7B, first touch panel 10 displays, for example, amount of money information 100, and second touch panel 12 displays, for example, PIN input screen 101.

The display positions and/or the display orientations of the respective display elements constituting amount of money information 100 and PIN input screen 101 are different between FIG. 7A and FIG. 7B. The display of amount of money information 100 is the work screen related to the work category "amount of money input", and is permitted for displaying on first display unit 29 as shown in FIG. 4. The display positions and/or the display orientations of the respective display elements constituting the work screen are permitted for changing based on the orientation of gravity detected by orientation detecting unit 61 (see FIG. 2). That is, with regard to the displaying of the work screen on first display unit 29, settlement terminal device 1 (see FIG. 2) performs the process corresponding to "Yes" in step S501 of the display flow shown in FIG. 5. Settlement terminal device 1 displays amount of money information 100 in the position and/or the orientation based on the detected result by orientation detecting unit 61 according to the process flow of the work screen display shown in FIG. 5 (step S504 in the process flow of the work screen display shown in FIG. 5).

In contrast, PIN input screen 101 is the work screen related to "PIN input", is prohibited from displaying on first display unit 29 as shown in FIG. 4, and is displayed on second display unit 45. On the display screen of second display unit 45, the display positions and/or the display orientations of the respective display elements (numeric keys, an "enter" key, and a "delete" key) constituting PIN input screen 101 which is the work screen are permitted for changing based on the orientation of gravity detected by orientation detecting unit 61. That is, with regard to the displaying of the work screen on second display unit 45, settlement terminal device 1 (see FIG. 2) performs the process corresponding to "Yes" in step S501 of the display flow shown in FIG. 5. Settlement terminal device 1 displays the respective software keys in the positions and/or the orientations based on the detected result by orientation detecting unit 61 according to the process flow of the work screen display shown in FIG. 5 (step S504 of the process flow of FIG. 5).

Accordingly, the display positions and/or the display orientations of the respective display elements constituting PIN input screen 101 depend on the orientation of settlement terminal device 1 with respect to gravity.

For example, in FIG. 7A, gravity is headed downward (positive direction in a Y axis). In this case, first display unit 29 and second display unit 45 control the positions and/or the orientations of the respective display elements such that Y-axis positive sides are lower sides in the display content. For example, the "respective display elements" in this case refers to the numeral keys of "0" to "9", the "enter" key and the "delete" key on PIN input screen 101. For example, first display unit 29 and second display unit 45 align character display orientations such that the Y-axis positive sides are lower sides of characters. First touch panel 10 and second touch panel 12 display a screen in which the positions and/or the orientations of the respective display elements are controlled. Thus, for example, even though the orientation of settlement terminal device 1 shown in FIG. 7A is a vertical orientation, the user can easily recognize amount of money information 100 and PIN input screen 101.

In FIG. 7B, gravity is headed downward (negative direction in an X axis). The state of FIG. 7B is a state where settlement terminal device 1 is rotated from the state of FIG. 7A by 90 degrees in the counterclockwise direction. In FIG. 7B, first touch panel 10 is positioned on a left side of settlement terminal device 1, and second touch panel 12 is positioned on a right side of settlement terminal device 1. In this case, first display unit 29 and second display unit 45 control the orientation of the display content such that X-axis negative sides are lower sides of the display content. First touch panel 10 and second touch panel 12 display a work screen in which the positions and/or the orientations of the respective display elements are controlled, that is, PIN input screen 101. The controlling of the display content includes the controlling of PIN arrangement, and the orientation of the PIN arrangement with the gravity of gravity is the same in FIG. 7A and FIG. 7B.

That is, on the "PIN input screen 101" which is the work screen of second display unit 45, the "enter" key is relatively displayed on a right side than other display elements with the orientation of gravity. This display orientation is displayed from the left to the right in the orientation perpendicular to the orientation of gravity. The "delete" key is relatively displayed on a left side than other display elements to the orientation of gravity. The display orientation of the "delete" key is the same as that of the "enter" key. The "amount of money information 100" which is the work screen of first display unit 29 is nearly displayed on an upper left side of first display unit 29 with respect to the orientation of gravity. The display orientation thereof is the same as those of the "enter" key and the "delete" key.

As stated above, PIN input screen 101 is rotated along with the orientation of settlement terminal device 1 detected by orientation detecting unit 61. Thus, for example, even though the orientation of settlement terminal device 1 is a horizontal orientation as shown in FIG. 7B, the user can easily recognize the amount of money information and PIN input screen 101. That is, since the orientation of PIN input screen 101 is determined depending on the orientation of settlement terminal device 1 with respect to gravity, the orientation of the screen with respect to the user can be fixed regardless of the orientation in which the user holds settlement terminal device 1. Accordingly, it is possible to easily perform the input operation and display confirmation of the transaction process that tries to start the settlement, and it is possible to improve convenience of the user. For example, when settlement terminal device 1 is simply rotated, the orientation of the display content is displayed by being rotated with respect to gravity. However, it is possible to avoid the rotation of the display content with respect to gravity, and thus, the settlement operation and the settlement confirmation by the user are easily performed.

The switching between the orientation of the display content shown in FIG. 7A and the orientation of the display content shown in FIG. 7B is discontinuously performed. For example, when orientation detecting unit 61 (see FIG. 2) detects that settlement terminal device 1 is rotated from the state of FIG. 7A by 45 degrees in the counterclockwise direction, first display unit 29 and second display unit 45 of settlement terminal device 1 may switch the orientation of the display content to the state of FIG. 7B.

Before the input is finished after the PIN input is started, even though orientation detecting unit 61 (see FIG. 2) detects the rotation of settlement terminal device 1, first display unit 29 and second display unit 45 may perform controlling such that the display orientation of first touch panel 10 or second touch panel 12 is not changed. Thus, since these input orientations are not changed before the PIN input is finished, the user are not bewildered during the PIN input, and the settlement operation and the settlement confirmation by the user are easily performed.

Figure 8:
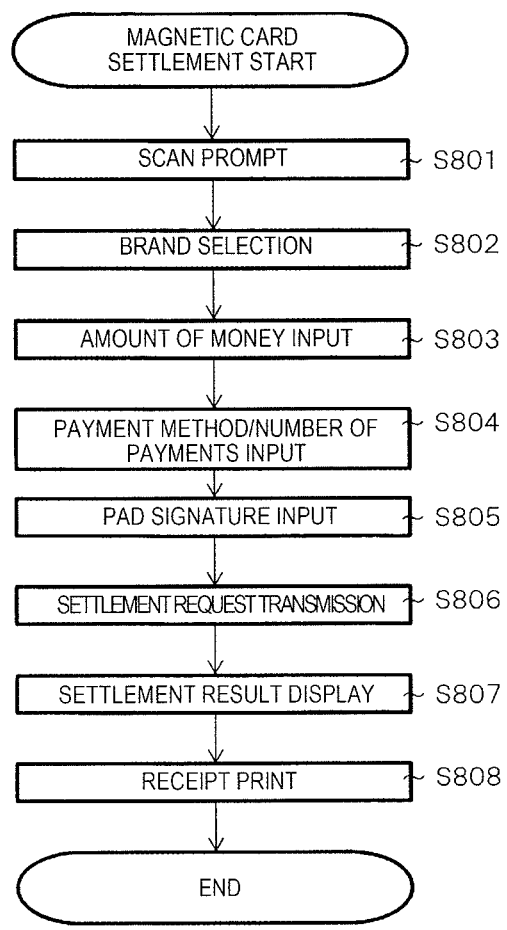
FIG. 8 is a flowchart showing an example of a magnetic card settlement process by the settlement terminal device.
Figure 9A:
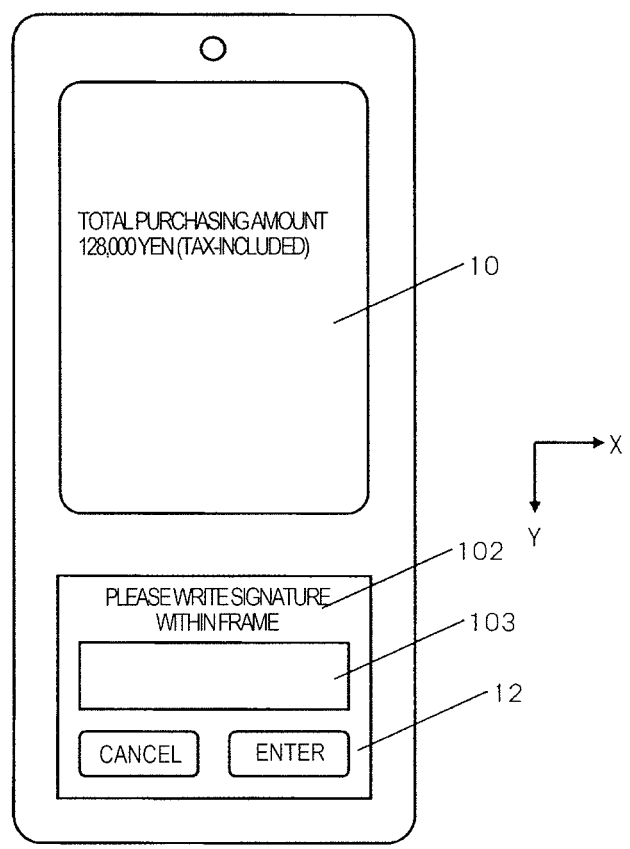
FIG. 9A is a schematic diagram showing a display example of amount of money information and a PAD signature input screen in the settlement terminal device.
Figure 9B:
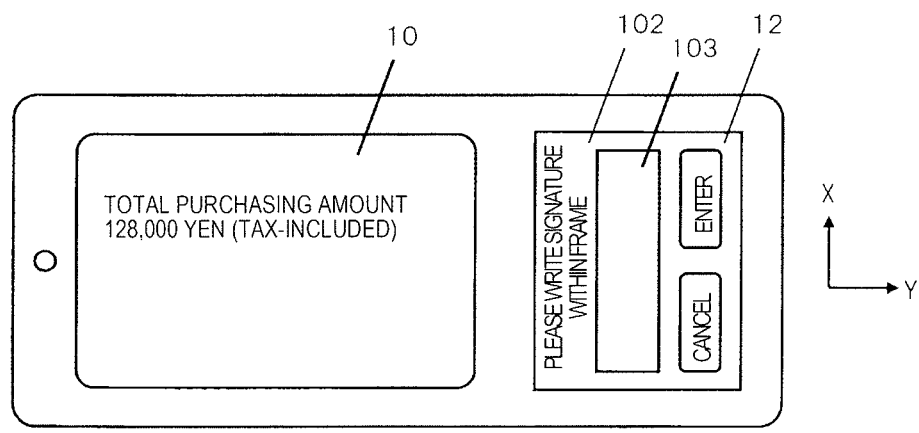
FIG. 9B is a schematic diagram showing a display example of amount of money information and a PAD signature input screen in the settlement terminal device according to the first exemplary embodiment.

Next, the relationship between a magnetic card settlement process and a display screen will be described. FIG. 8 is a flowchart showing an example of the magnetic card settlement process by settlement terminal device 1. FIGS. 9A and 9B are schematic diagrams showing display examples of amount of money information 100 and PAD input screen 102 in settlement terminal device 1.

In FIG. 8, when the magnetic card settlement process is started, settlement terminal device 1 (see FIG. 2) displays scan prompt for prompting the operator to read information related to a card used for the settlement according to the display flow shown in FIG. 5 described above (S801). As shown in FIG. 4, the scan prompt is permitted for displaying on first display unit 29 (see FIGS. 1 and 2) which is the non-secure display region, and is permitted for rotating of the display orientation thereof. Accordingly, with regard to the displaying of the scan prompt on first display unit 29, settlement terminal device 1 performs the process corresponding to "Yes" in step S501 of the display flow shown in FIG. 5. Thus, the display screen of the scan prompt in step S801 of FIG. 8 is displayed in the position and/or the orientation based on the detected result by orientation detecting unit 61 (see FIG. 2) of settlement terminal device 1.

When the card is read by magnetic card reader 35 (see FIG. 2), settlement terminal device 1 displays a selection screen of card brand information used for the settlement (S802). As shown in FIG. 4, the selection screen of the card brand information is permitted for displaying on first display unit 29 which is the non-secure display region, and is permitted for rotating of the display orientation thereof. Accordingly, with regard to the displaying of the selection screen of the card brand information on first display unit 29, settlement terminal device 1 performs the process according to "Yes" in step S501 of the display flow shown in FIG. 5. Thus, the selection screen of the card brand information in step S802 of FIG. 8 is displayed in the position and/or the orientation based on the detected result by orientation detecting unit 61 of settlement terminal device 1.

When the card brand information used for the settlement is selected, settlement terminal device 1 displays an amount of money input screen to be settled (S803). As shown in FIG. 4, the amount of money input screen is permitted for displaying on first display unit 29 which is the non-secure display region, and is permitted for rotating of the display orientation thereof. Accordingly, with regard to the displaying of the amount of money input screen on first display unit 29, settlement terminal device 1 performs the process corresponding to "Yes" in step S501 of the display flow shown in FIG. 5. Thus, the amount of money input screen in step S803 of FIG. 8 is displayed in the position and/or the orientation based on the detected result by orientation detecting unit 61 of settlement terminal device 1.

When the settlement amount of money is input, settlement terminal device 1 displays a payment method selection/number of payments input screen (S804). As shown in FIG. 4, the payment method selection/number of payments input screen is permitted for displaying on first display unit 29 which is the non-secure display region, and is permitted for rotating of the display orientation thereof. Accordingly, with regard to the displaying of the payment method selection/number of payments input screen on first display unit 29, settlement terminal device 1 performs the process corresponding to "Yes" in step S501 of the display flow shown in FIG. 5. Thus, the payment method selection/number of payments input screen in step S804 of FIG. 8 is displayed in the position and/or the orientation based on the detected result by orientation detecting unit 61 of settlement terminal device 1.

When the selection of the payment method and the number of payments input are performed, settlement terminal device 1 displays a PAD signature input screen (S805). As shown in FIG. 4, the PAD signature input screen is prohibited from displaying on first display unit 29 which is the non-secure display region, and is permitted for displaying on second display unit 45 (FIGS. 1 and 2) which is the secure display region. The PAD signature input screen is prohibited from rotating of the display orientation thereof. Accordingly, with regard to the displaying of the PAD signature input screen on second display unit 45, settlement terminal device 1 performs the process corresponding to "No" in step S501 of the display flow shown in FIG. 5. Thus, the PAD signature input screen in step S805 of FIG. 8 is displayed in a fixed orientation (for example, landscape direction) regardless of the detected result by orientation detecting unit 61 (see FIG. 2) of settlement terminal device 1. The displaying example of the PAD signature input screen on the second display unit of settlement terminal device 1 will be described below.

When the signature is input, settlement terminal device 1 transmits a settlement request to a settlement center (not shown) (S806), and displays a screen indicating that the settlement process is being performed before a settlement result is received from the settlement center. As shown in FIG. 4, the screen displayed before the settlement result from the settlement center is received after the settlement request is transmitted by settlement terminal device 1 is permitted for displaying on first display unit 29 (see FIGS. 1 and 2) which is the non-secure display region, and is permitted for rotating of the display orientation thereof. Accordingly, with regard to the displaying of the screen displayed before the settlement result from the settlement center is received after the settlement request is transmitted by settlement terminal device 1 on first display unit 29, settlement terminal device 1 performs the process corresponding to "Yes" in step S501 of the display flow shown in FIG. 5. Thus, in step S806 of FIG. 8, the screen displayed before the settlement result from the settlement center is received after the settlement request is transmitted by settlement terminal device 1 is displayed on the position and/or the orientation based on the detected result by orientation detecting unit 61 (see FIG. 2) of settlement terminal device 1.

Settlement terminal device 1 displays the settlement result received from the settlement center (S807), and after the settlement result is printed as a receipt (S808), the magnetic card settlement process is ended. As shown in FIG. 4, the display screen of the settlement result in step S807 is permitted for displaying on first display unit 29 (see FIGS. 1 and 2) which is the non-secure region, and is permitted for rotating of the display orientation thereof. Accordingly, with regard to the displaying of the settlement result on first display unit 29, settlement terminal device 1 performs the process corresponding to "Yes" in step S501 of the display flow shown in FIG. 5. Thus, the display screen of the settlement result in step S807 of FIG. 8 is displayed in the position and/or the orientation based on the detected result by orientation detecting unit 61 (see FIG. 2) of settlement terminal device 1. The subsequent display screen is the same as the display screen in step S608.

The PAD signature input screens 102 of FIGS. 9A and 9B displayed in step S805 of FIG. 8 described above will be described in detail. In FIG. 9A, gravity is headed downward (positive direction in the Y axis). In FIG. 9B, gravity is headed downward (negative direction in the X axis).

The display of the amount of money information 100 is the work screen related to the work category "amount of money input", and is permitted for displaying on first display unit 29 as shown in FIG. 4. The positions and/or the orientations of the respective display elements constituting the work screen are permitted for changing based on the orientation of gravity detected by orientation detecting unit 61 (see FIG. 2). The permission for changing is the same as those of FIGS. 8A and 8B. That is, with regard to the displaying of the work screen on first display unit 29, settlement terminal device 1 (see FIG. 2) performs the process corresponding to "Yes" in step S501 of the display flow shown in FIG. 5. Settlement terminal device 1 displays amount of money information 100 in the position and/or the orientation based on the detected result by orientation detecting unit 61 according to the process flow of the work screen display shown in FIG. 5 (step S504 in the process flow of the work screen display shown in FIG. 5).

In contrast, PAD signature input screen 102 is the work screen related to "PAD signature input" in FIG. 4, is prohibited from displaying on first display unit 29, and is displayed on second display unit 45. On the display screen of second display unit 45, the display position and/or the display orientation of "signature input field" 103 which is the display element constituting PAD input screen 102 which is the work screen are displayed by being fixed in a predetermined position and/or orientation on housing 11. That is, with regard to the displaying of the work screen on second display unit 45, settlement terminal device 1 (see FIG. 2) performs the process corresponding to "No" in step S501 of the display flow shown in FIG. 5. Settlement terminal device 1 displays signature input field 103 in a (independent) position and/or orientation irrelevant to the detected result by orientation detecting unit 61 according to the process flow of the work screen display shown in FIG. 5 (step S502 in the process flow of the work screen display shown in FIG. 5).

In FIG. 9B, the display positions and/or the display orientations of the respective display elements of PAD signature input screen 102 do not depend on the orientation of gravity detected by orientation detecting unit 61. In this case, even though settlement terminal device 1 is rotated from the state of FIG. 9A by 90 degrees in the counterclockwise direction, the display orientation and the input orientation on PAD signature input screen 102 are not changed.

Accordingly, in FIG. 9A, the lower side (negative direction in the X axis) of the display content of PAD input screen 102 and the orientation (negative direction in the X axis) of gravity match each other. However, in FIG. 9B, the lower side (positive direction in the Y axis) of the display content of PAD input screen 102 and the orientation (negative direction in the X axis) of gravity do not match each other. For example, when a sufficient length easy to write the signature can be obtained as the length of signature input field 103 in a longitudinal direction, the display orientation and the input orientation of PAD signature input screen 102 are more preferably controlled to the orientations shown in FIGS. 9A and 9B.

As mentioned above, PAD signature input screen 102 is displayed in a certain orientation with respect to settlement terminal device 1 without depending on the orientation of settlement terminal device 1. In the state shown in FIG. 9A, since signature input field 103 of PAD signature input screen 102 is positioned in a horizontal state, it is easy to horizontally write the PAD signature input. When the number of characters in the signature to be input is large, it is especially useful to sufficiently obtain the length of signature input field 103 in the input orientation. Accordingly, as shown in FIG. 9B, in order to sufficiently obtain the length of signature input field 103 in the input orientation, it is preferred that PAD signature input screen 102 is not rotated in line with the display orientation of first touch panel 10. In this case, the signature input is performed in an X direction similarly to FIG. 9A. Thus, even though the orientation in which the user holds settlement terminal device 1 is changed, it is possible to prevent the orientation of PAD signature input screen 102 with settlement terminal device 1 from being frequently changed. The signature input operation and the display confirmation of the transaction process that tries to start the settlement are easily performed, and thus, convenience of the user is improved In second display unit 45 of FIG. 9B, signature input field 103 of PAD signature input screen 102 is displayed in a orientation in which it is difficult for the operator of settlement terminal device 1 to confirm the display content and input the signature. That is, the orientation of the signature input in FIG. 9B is parallel to the orientation of gravity. However, the display orientation of amount of money information 100 of first display unit 29 of FIG. 9B is perpendicular to the orientation of gravity, and is displayed from the left to the right in the orientation perpendicular to the orientation of gravity. Amount of money information 100 displayed on first display unit 29 is displayed in the orientation in which the confirmation by the operator of settlement terminal device 1 is easily performed.

That is, the easiness of the confirmation of the display content by the operator of settlement terminal device 1 shown in FIG. 9B is different between the display content on first display unit 29 and the display content on second display unit 45. In order to set the easiness of the confirmation of the display contents on two display units to the same extent, the operator switches settlement terminal device 1 to the state of FIG. 9A. Accordingly, there is an effect of prompting the operator to switch settlement terminal device 1 from the display state shown in FIG. 9B to the state of FIG. 9A.

Figure 10A:
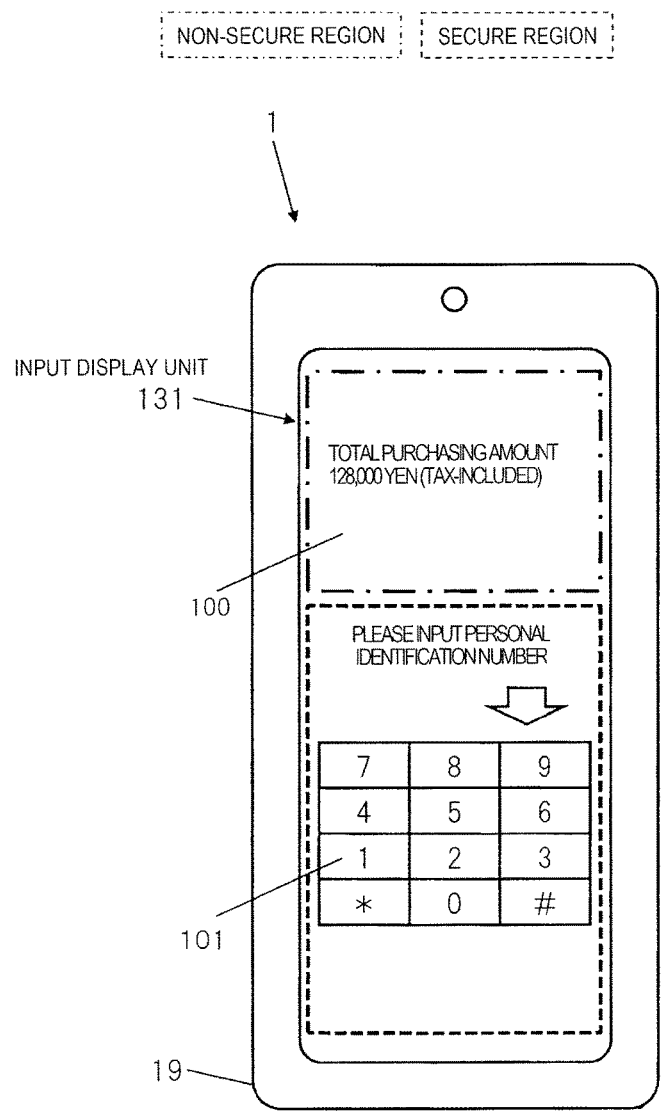
FIG. 10A is a front external view showing a display example of a personal identification number (PIN) input screen and amount of money information in the settlement terminal device according to a modification example of the first exemplary embodiment.
Figure 10B:
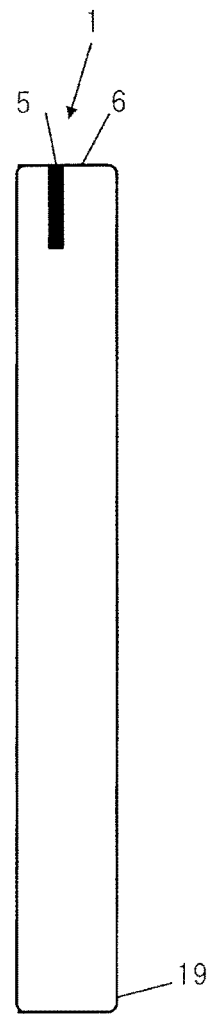
FIG. 10B is a side external view showing an example of the settlement terminal device according to the modification example of the first exemplary embodiment.
Figure 11:
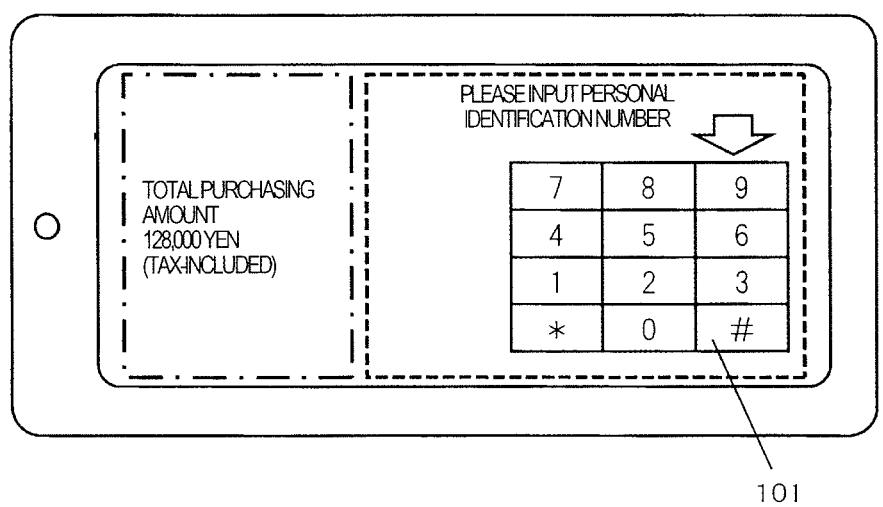
FIG. 11 is a schematic diagram showing a display example of a personal identification number (PIN) input screen and amount of money information in the settlement terminal device according to the modification example of the first exemplary embodiment.
Figure 12A:
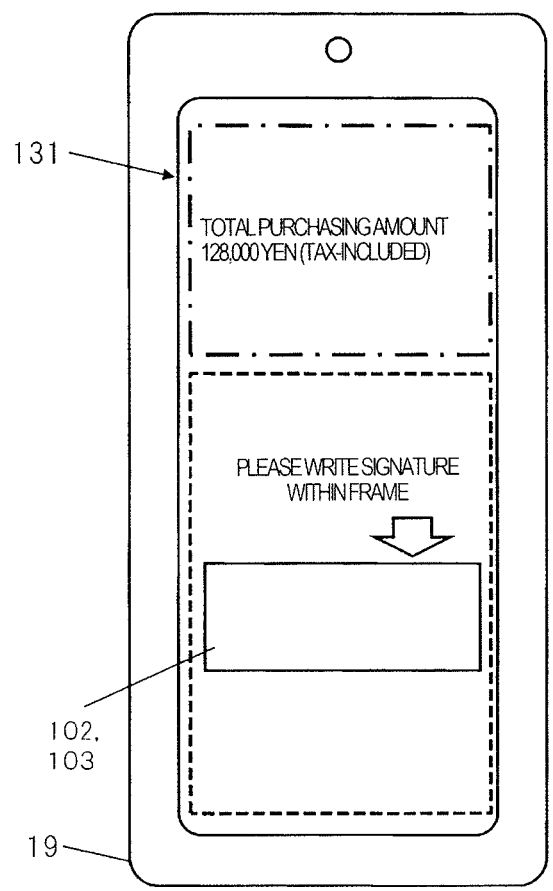
FIG. 12A is a schematic diagram showing a display example of a PAD signature input screen and amount of money information in the settlement terminal device according to the modification example of the first exemplary embodiment.
Figure 12B:
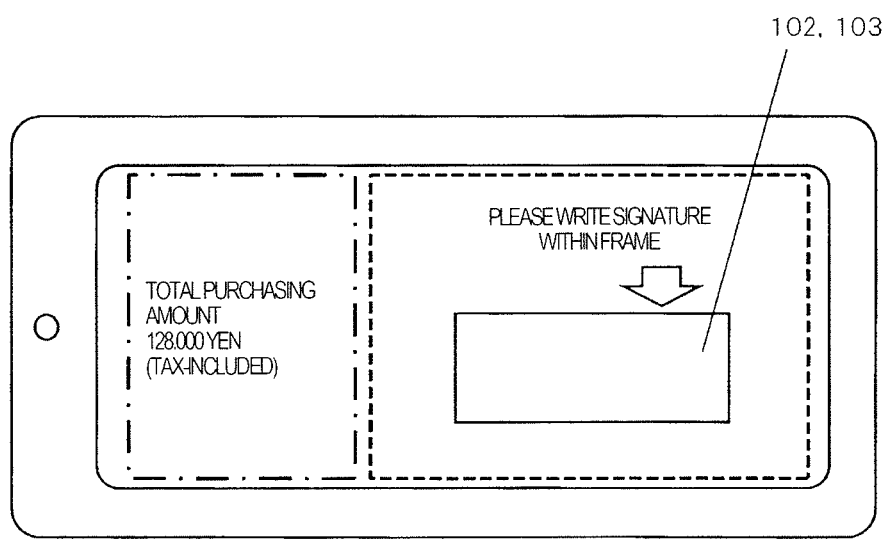
FIG. 12B is a schematic diagram showing a display example of a PAD signature input screen and amount of money information in the settlement terminal device according to the modification example of the first exemplary embodiment.

Settlement terminal device 1 according to Exemplary Embodiment 1 described above includes first touch panel 10 and second touch panel 12 within one housing, but the information processing device of the present invention may be a device in which the first information processing unit including first touch panel 10 and the second information processing unit including second touch panel 12 can be coupled. As shown in FIGS. 10 to 12, the information processing device of the present invention may configure the secure display region and the non-secure display region in one touch panel display unit. In such an information processing device, the work screen including PIN input screen 101 or PAD signature input screen 102 may be displayed in, for example, the secure display region, and the work screen including amount of money information 100 may be displayed in the non-secure display region. For example, the display positions and/or the display orientations of the respective display elements constituting these work screens with respect to the orientation of gravity may be configured for each of the work screens as described above.

As described above, according to settlement terminal device 1 according to Exemplary Embodiment 1, the display attributes of the work screens of the respective work categories, that is, the positions and/or the orientations of the respective display elements constituting the work screen are configured for each of the work categories. Thus, even though software that processes the respective work categories is changed, the display attributes of the corresponding work screen are independently defined as including the work category. Accordingly, the positions and/or the orientations of the respective display elements constituting the display of the work screen are configured for each of the work categories are configured simply and reliably such that the positions and/or the orientations thereof is easily controlled by an operator. The operator of the terminal device can easily confirm the input unit for inputting the information constituting the display content without stress in an optimum manner of the respective work categories, and thus, convenience of the operator is improved. That is, in such a configuration, the input and display of settlement terminal device 1 can be improved so as to be suitable for the respective work screens. Accordingly, it is possible to easily perform input operation and display confirmation of the transaction process that tries to start the settlement, and it is possible to improve convenience of the user.

What is claimed is:

1. A transaction terminal device, comprising:
a display that includes a first area for displaying a transaction and a second area for inputting authentication information in accordance with the transaction;
an orientation detector that detects an orientation of the transaction terminal device with respect to gravity;
a processor; and
a memory that stores instructions which cause the processor to perform operations comprising:
rotating the first area displayed on the display based on the orientation of the transaction terminal device detected by the orientation detector; and
non-rotating the second area displayed on the display based on the orientation of the transaction terminal device detected by the orientation detector,
wherein the processor displays the second area in a fixed orientation,
the second area is a software signature pad for writing a signature, and
at least the second area is a touch panel display.

2. The transaction terminal device of claim 1,
wherein the processor detects the orientation of the display based on the orientation of the transaction terminal device detected by the orientation detector.

3. The transaction terminal device of claim 1,
wherein the second area is a software keypad.

4. An information processing device, comprising:
a display that includes a first area configured to display one of work screens and a second area configured to display one of work screens;
an orientation detector that detects an orientation of the information processing device with respect to gravity;
a processor; and
a memory that stores instructions which cause the processor to perform operations comprising:
rotating a first work screen, corresponding to one of the work screens, displayed on the first area of the display based on the orientation of the information processing device detected by the orientation detector; and
non-rotating a second work screen, corresponding to one of the work screens, displayed on the second area of the display based on the orientation of the information processing device detected by the orientation detector,
wherein the second work screen is displayed in a fixed position and orientation,
the second work screen includes a signature input screen for inputting a signature, and a signature input field which is an element of the work screen is displayed in the fixed position and orientation, and
at least the second work screen is a touch panel display.

5. The information processing device of claim 4,
wherein a third work screen including a PIN input screen for inputting a personal identification number (PIN) is displayed on the second area of the display, numeral keys and functional keys which are elements of the PIN input screen being rotated based on the orientation of the information processing device detected by the orientation detector.

6. An information processing method of an information processing device, the information processing device including a display, the display including a first area for displaying work screens and a second area for displaying work screens, the information processing method comprising:
detecting an orientation of the information processing device with respect to gravity;
rotating a first work screen, corresponding to one of the work screens, displayed on the first area of the display based on the orientation of the information processing device; and
non-rotating a second content, corresponding to one of the work screens, displayed on the second area of the display based on the orientation of the information processing device,
wherein the second work screen is displayed in a fixed position and orientation,
the second work screen includes a signature input screen for inputting a signature, and a signature input field which is an element of the work screen is displayed in the fixed position and orientation, and
at least the second work screen is a touch panel display.

7. The transaction terminal device of claim 1,
wherein both the first area and the second area are a part of a same display.

8. The transaction terminal device of claim 1,
wherein the first area is a separate display than the second area.

9. The information processing device of claim 4, the operations further comprising:
rotating a third work screen, corresponding to one of the work screens, displayed on the second area of the display based on the orientation of the information processing device detected by the orientation detector.

10. The information processing device of claim 4,
wherein both the first area and the second area are a part of a same display.

11. The information processing device of claim 4,
wherein the first area is a separate display than the second area.

12. The information processing method of 6, further comprising:
rotating a third work screen, corresponding to one of the work screens, displayed on the second area of the display based on the orientation of the information processing device detected by the orientation detector.

* * * * *